INVENTORS.
Robert C. Treseder
James W. Light
Spencer, Hardman & Fehr
THEIR ATTORNEYS

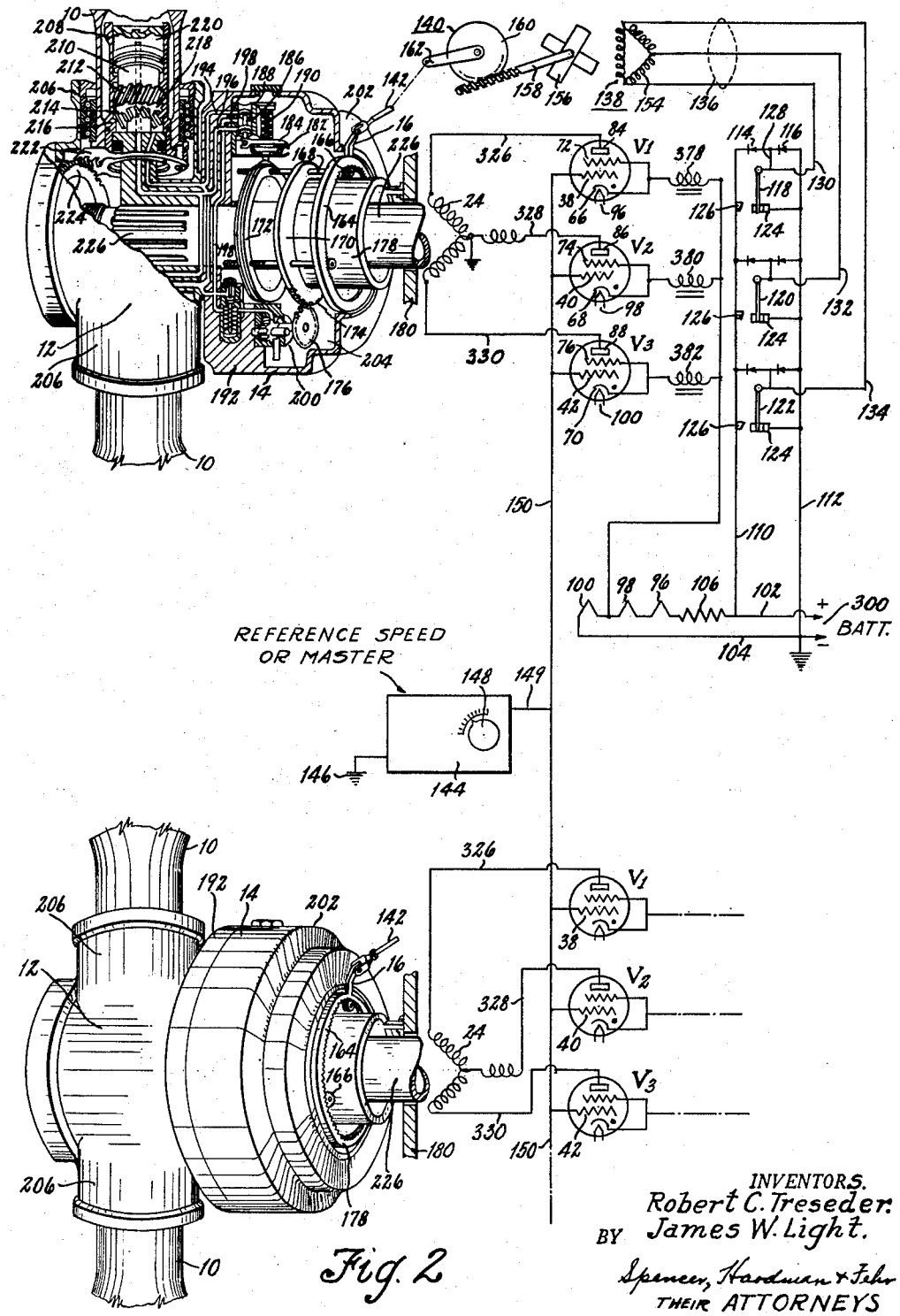

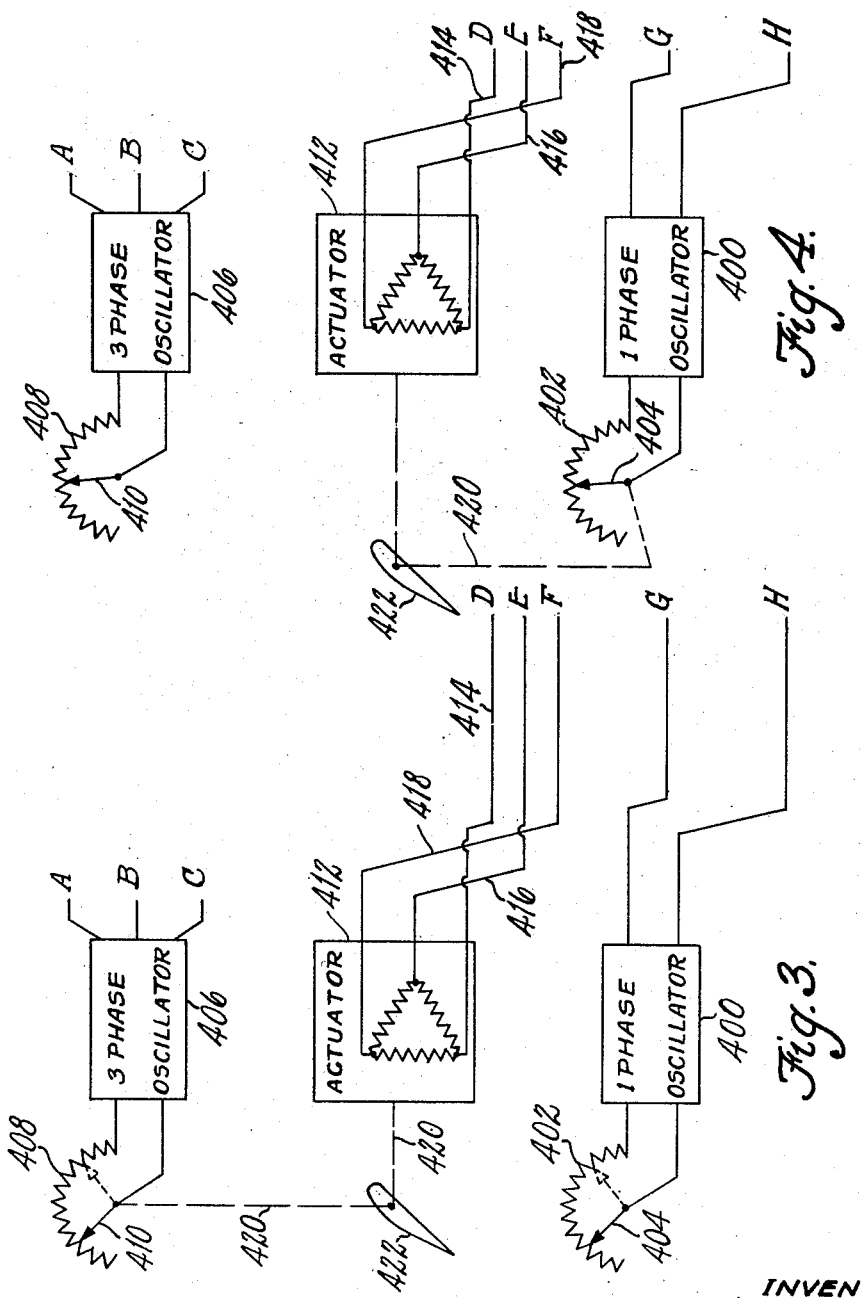

Patented Mar. 23, 1954

2,673,309

UNITED STATES PATENT OFFICE 2,673,309

BIASING TYPE ELECTRONIC SYNCHRONIZER

James W. Light, Greenville, and Robert C. Treseder, Dayton, Ohio, assignors to General Motors Corporation, Detroit, Mich., a corporation of Delaware Application May 24, 1949, Serial No. 94,944

11 Claims. (Cl. 317—6)

This invention relates to the coincident operation of two or more engine-propeller combinations in aircraft, and has for a prime object thereof to effect the synchronous operation of all such combinations.

Another object of the invention is to provide for the synchronous operation of a plurality of such combinations with respect to a master speed source or reference speed adjusted to a predetermined value.

Another object of the invention is to synchronize the operation of a second engine-propeller combination with the operation of a first engine-propeller combination operating as a selective speed master control.

Another object of the invention is to synchronize a purality of self-governed engine-propeller combinations, each individually adjustable by manual speed selecting means, which synchronization is accomplished by an inertialess means adapted to bias the manual control of the erring combination in a direction to effect the proper correction for agreement with a master or reference speed setting.

Another object of the invention is to provide a phase sensitive circuit for comparing the speed sensitive electrical outputs of a plurality of engine-propeller combinations, and convert any differences in electrical quantities to mechanical motion for adjusting the speed setting of an erring engine-propeller combination.

A further object of the invention is to provide a phase sensitive circuit for comparing the speed of rotation of a plurality of rotating devices and to convert any differences to mechanical adjustment of the erring device.

A further object of the present invention is to provide a frequency sensitive servo mechanism suitable to use for remote actuation of aircraft control surfaces or other similar applications.

A further object of the present invention is to effect synchronous operation of two or more engine propeller combinations by combining electronically in a phase discriminator, a single phase voltage proportional to the speed of one engine, with a multiphase voltage proportional to the speed of the second engine, to thereby produce a multiphase beat frequency proportional to the off-speed error and to thereafter use this beat frequency to adjust the speed of the erring engine-propeller combination.

A still further object is to provide a simple, sensitive and effective synchronization control for load sensitive prime movers.

These above objects are accomplished by providing each engine propeller, or rotary prime mover variable load combination, with both a means for producing an alternating current frequency proportional to rotary speed, and a means for adjusting the load in response to the difference between the frequency of the alternating current thus produced, and a reference alternating current frequency. The reference alternating current frequency may be produced by using any standard frequency generation device, or by using one of the prime movers as a reference and using the output of its alternating frequency generator as a reference frequency. The difference in frequency between the reference frequency and that produced by the controlled prime mover driven alternator is utilized in the present invention by the inclusion of a phase sensitive circuit consisting of three thyratrons, or other gas filled tubes, and a three phase motor energized by the output from these gas filled tubes, to adjust the load of the controlled prime mover to bring the speed of the prime mover into synchronism. The reference speed is manually selected by adjusting the speed of the reference prime mover, or master frequency source, and the synchronizer system then brings the controlled prime mover into synchronism with the reference speed. In a specific embodiment of this invention the object mentioned above is accomplished by connecting the three phases of an engine driven three phase alternator to the plates of three thyratrons respectively so that these plates will be energized in a definite order, and at a rate determined by the speed of the engine driven alternator or tachometer. The single phase from the master oscillator or reference alternator is introduced to the control grid of each of the tubes. A relay coil is connected in the circuit of each of these thyratrons in such a manner that it is energized when its associated thyratron is conducting. These relays are connected so as to energize the three coils of a three phase motor used to adjust the load of its associated prime mover. During "on speed" conditions, that is, at such times when the controlled engine is rotating at controlled or reference speed, only one of the tubes will fire or conduct. This continually energizes only one of the phases of the follow-up motor and therefore this motor does not rotate and the load remains at a fixed magnitude. During "off speed" conditions the tubes conduct in sequence either 1—2—3 or 3—2—1, the sequence depending on whether the prime mover is rotating at less or greater than reference speed. This sequential firing of the thyratrons energizes the three phases of the follow-up motor in sequence thus causing its armature to rotate and readjust the magnitude of the load so as to bring its associated prime mover into synchronous speed with the oscillator or reference alternator frequency. It is intended that the output of the engine driven armature may be connected to the control grids of the thyratrons and the reference frequency connected to the plates if so desired without departing from the scope of the present invention. It is also intended that a single phase alternator may be driven by a prime mover, and its output used instead of an output from a reference frequency armature. Either of the engines or prime movers may of course be used as a reference and the output from the thyratrons used to control the other engine.

In the drawings, Figure 1 is a circuit diagram of one arrangement of our invention.

Figure 2 illustrates the modified arrangement of our invention with a hydraulic means illustrated for adjusting propeller pitch in accordance with the off speed conditions.

Figures 3 and 4 are modifications of control apparatus suitable to be used as servo mechanism from remote actuation of aircraft surfaces and the like.

Description (Figure 1)

Figure 1:
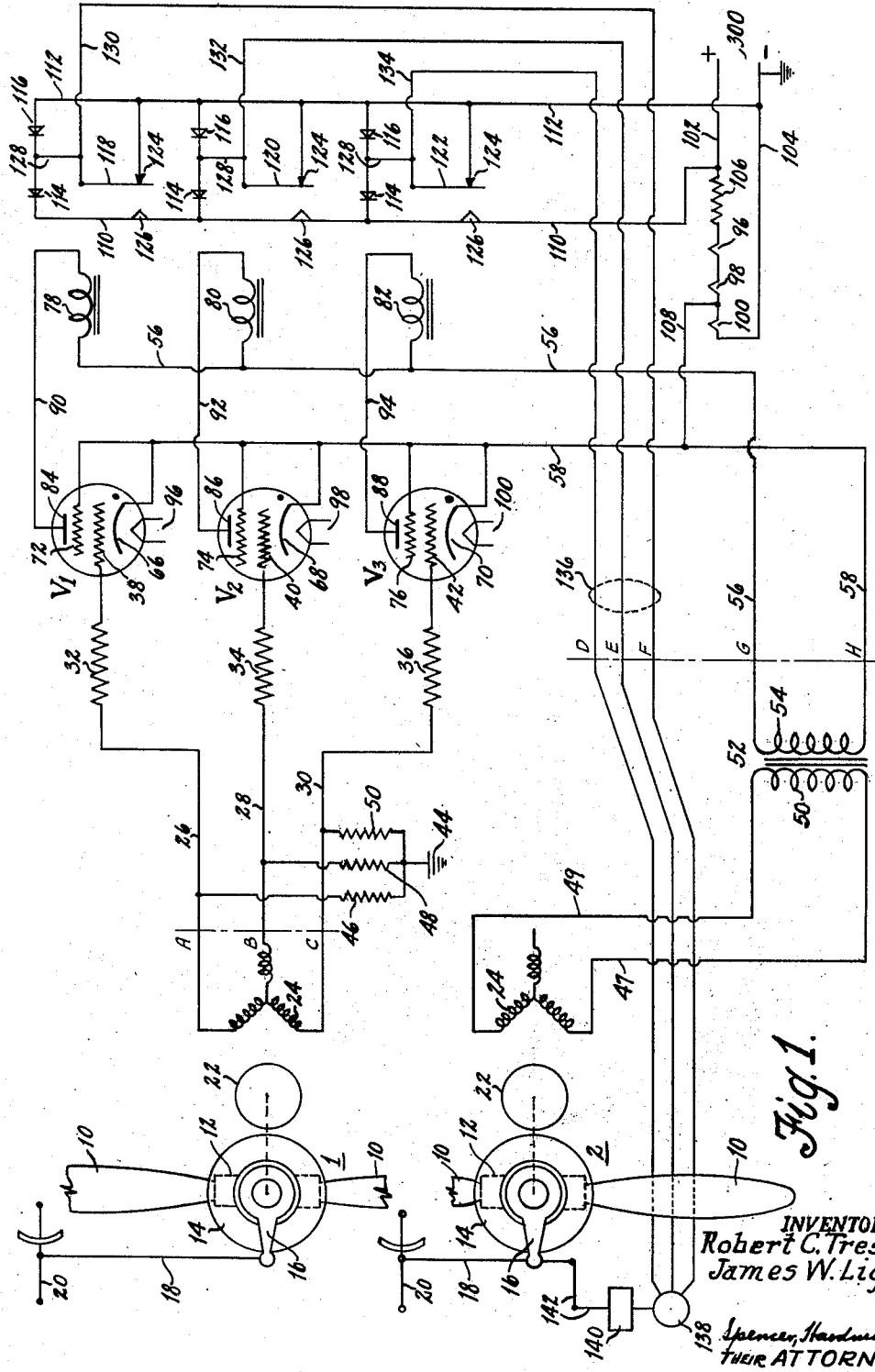

Referring more particularly to Figure 1 of the drawings, the reference numeral 1 refers to a "master" engine-propeller combination whose speed will be used as the reference speed. The numeral 2 refers to a "slave" engine-propeller combination which is to be controlled to the reference speed of engine 1. Each of these engines has an adjustable pitch propeller including a plurality of blades 10, shiftable in propeller hubs 12 each of which is fitted with a regulator 14 for controlling the pitch of its associated propeller blades. These regulators 14 are controlled by arm 16 and associated linkage which in each case may include a pilot's control lever 20 and associated link arm 18. Manual movement of the lever 20 operates on the control arm 16 through the linkage 18 to manually control the pitch of the associated propeller. Each of the engines also has associated therewith a three phase alternator including rotor 22 and stator 24. These two alternators are of the conventional type in which the rotation of the rotor produces a three phase output signal, one phase across each of the windings and spaced 120 electrical degrees apart. In the instant case these phases are impressed across the resistors 46, 48 and 50 respectively to a common ground 44. The voltage across each of these three resistors is introduced to the grids 38, 40 and 42 of the gas filled tubes V1, V2 and V3 by means of conductors 26, 28 and 30 and resistors 32, 34 and 36 respectively. Under such a circuit arrangement each of the grids 38, 40 and 42 has an alternating voltage impressed thereon in sequence at intervals of 120 electrical degrees as determined by the engine driven alternator.

The slave engine propeller combination 2 uses only a single phase of the output of its alternator. This output signal is impressed across the primary 50 of the step-up transformer 52 by means of conductors 47 and 49. The alternating current voltage produced across this secondary 54 is impressed on the conductors 56 and 58. The voltage appearing on the conductor 56 is impressed upon the plates 84, 86 and 88 simultaneously through relay coils 78, 80 and 82 and conductors 90, 92 and 94 respectively. The conductor 58 is directly connected to the cathodes 66, 68 and 70 and the suppressor grids 72, 74 and 76 of the thyratrons V1, V2 and V3 respectively. It will thus be seen that as the rotor 22 connected to the engine 2 is rotated, an alternating current signal is impressed between the cathode and plate of all three of the tubes through the coils of all three of the relays simultaneously. Under these conditions it requires only that the tube be in condition to conduct in order to have alternating current flowing through the relay coils and thus energize the relay. The heater filaments 96, 98 and 100 of the tubes V1, V2 and V3 are connected in series through a dropping resistor 106 to the source of D. C. voltage supply including conductors 102 and 104. A conductor 108 effectively connects the conductor 58 to ground through heater 100. The D. C. power supply 300 is connected in parallel across three pairs of series connected rectifiers 114-116 by means of conductors 110 and 112. Each of these three pairs of rectifiers are center tapped at 128 to the movable contact of a relay while their positive terminal is connected to one stationary contact 126 of these three relays and their negative terminal connected to the other stationary contact 124 of each of these three relays. These three relays have armatures 118, 120 and 122 which are controlled by relay coils 78, 80 and 82 respectively. The movable contact armatures 118, 120 and 122 are connected to the three windings of the motor 138 by means of the conductors 130, 132 and 134 respectively. These three conductors are carried in a cable designated generally as 136. The motor 138 actuates the regulator arm 16 through reduction gear 140 and linkage 142.

Operation (Figure 1)

The operation of the synchronizing system which is the subject of the present invention depends on the thyratrons V1, V2 and V3 each conducting when their respective grids and plates are of the correct potential and polarity. It is well-known that a thyraton will fire or conduct when a sufficient positive potential is introduced on its plate and a sufficient positive potential is also introduced on its grid. If the grid has a sufficient negative potential impressed on it, the tube will not conduct regardless of the magnitude of the positive potential on the plate. The relay armature in each of the relays shown in Figure 1 is attracted to close the contacts and energize the respective winding of the control motor 138 when their respective tube has the proper potential and polarity signal on its grid and plate. It may thus be seen that by controlling the conductivity of the tubes so that they conduct in sequence, a sequence of pulses will be introduced into the three windings of the motor 138 thereby setting up a rotating field to cause rotation of the motor rotor to adjust the pitch of the propeller blades of the slave engine 2. The direction of the field rotation and hence the direction of rotation of the rotor depends on the sequence of the firing of the tubes. Therefore the wiring is made so that the tubes conduct in the proper sequence to increase the pitch when the slave engine is over speed and to decrease the pitch of the propeller on the slave engine when that engine is under speed.

In the operation of this device, as shown in

Figure 1, the pilot's controls 20 for both engines are adjusted so that the engines are operating at approximately the same rotational speed. At this point the synchronizing system is cut in and both engines are then controlled by adjusting the speed of the master engine. We may of course use the master as a single phase source and the slave as a three phase source if so desired. In fact this arrangement would be very similar to the modification shown in Figure 2. In Figure 1 however we have the follow-up motor 138 and gear 140 with linkage 142 connected to the propeller adjusting means on engine 2 thereby making this engine a slave to engine 1. Under these conditions the master engine 1 by means of its three phase alternator 24 produces positive potentials on the grids 38, 40 and 42 of the tubes V1, V2 and V3 in sequence 120 electrical degrees apart. These positive pulses cause the grids to release control of the tube conduction during the time they are present on the grid. These tubes are thereby placed in condition whereby they will conduct whenever the proper potential plate voltage is placed on the tube simultaneously with the positive grid voltage.

The slave engine 2 by means of its alternator 24 and transformer 52 places a positive plate voltage on the plate of each tube simultaneously through its respective relay coil at intervals of 360 electrical degrees.

When the engines are operating at synchronous speed, this plate voltage will coincide with the grid voltage of only one tube and that tube will conduct causing a pulse of current in one of the windings of the follow-up motor each 360° of armature rotation. Thus, the follow-up motor 138 will then not have a rotating field, but a stationary pulsed field and therefore its rotor will remain stationary. If, on the other hand, the master engine 1 is rotating faster than the slave engine 2, the positive pulse on the plates of the tubes will first coincide with a positive pulse on the grid of the tube V3 and then drop back and coincide with the positive pulse on the grid of the tube V2. Following this it will drop back and coincide with the positive pulse on the tube V1. This sequence of coincidence between positive pulses will be repeated. The tubes therefore will fire in sequence V3, V2, V1 and repeat to energize the slave engine pitch control motor winding to create a rotating field in this motor 138 to decrease the pitch of the prop of the engine 2 thereby allowing this engine to increase its speed to a speed synchronous with that of the master engine. If the opposite conditions are true, namely, the speed of the master engine 1 being slower than that of the slave engine 2, the tubes will conduct in the sequence V1, V2, V3 and repeat thereby causing the rotor of the motor 138 to rotate in the opposite direction to increase the pitch of the propeller on the slave engine thereby slowing this engine down to synchronism with the master engine 1.

The motor 138 may be used to adjust the load on the slave prime mover of any prime mover load system where it is desired to operate a number of systems in synchronism with either a master system or a master oscillator.

*Description (Figure 2)*

Referring more particularly to Figure 2, a modification of the present invention is shown which is particularly suited for installations involving two or more engines, all the engines acting as slaves.

In this embodiment of the invention a standard signal source in the form of a stable adjustable single phase A. C. generator 144 is provided. This may be an oscillator or any other suitable source of single phase alternating current. The frequency of this source may be adjusted by the element 148 which in effect forms a pilot's speed control. This signal generator produces an A. C. voltage between the conductor 149 and ground 146. Since all of the engines are slaves in this embodiment of the present invention, the engine and controls are duplicates of each other. Figure 2 illustrates the complete embodiment of the control in one engine and part of the control in the second similar slave engine, the two engine-propeller systems are identical. In Figure 2 like numbers refer to like parts and like numbers in this figure also refer to like parts in Figure 1. Therefore the tubes V1, V2 and V3 are identical tubes to those referred to under like reference in Figure 1. As the embodiment shown in this figure is very similar in operation to that shown in Figure 1 and most of the elements are identical, it will not be necessary to describe these elements and certain of the operation features in detail.

In the modification shown in Figure 2, all of the engine-propeller combinations are slaves to a common single phase reference speed or master source 144. This master oscillator or reference frequency 144 generates a signal between the conductor 149 and ground 146 the frequency of which is dependent upon the pilot-controlled adjustment 148. The signal impressed on the conductor 149 is simultaneously impressed on the grids 38, 40 and 42 of the thyratrons V1, V2 and V3 by means of conductor 150. When this signal is positive, all three tubes are simultaneously in a condition to permit the passage of current between their respective plates and cathodes.

Each of the slave engine-propeller combinations drive a three phase alternator 24 the rotation of the armature of which generates a signal having three phases 120 electrical degrees apart which are sequentially impressed upon the plates 84, 86 and 88 of the thyratrons V1, V2 and V3 by means of conductors 326, 328 and 330 respectively. These tubes are thereby given a positive plate potential in sequence 120 electrical degrees apart. Each of these tubes will conduct whenever both its plate and grid have positive potentials of correct magnitude impressed thereon. It may therefore be seen that only one tube of each slave engine installation will conduct at a given time since a tube to conduct depends upon the signals impressed upon its grid and plate. The outer grids 72, 74 and 76 are directly connected to the cathodes 66, 68 and 70 as in the modification shown in Figure 1. The cathode circuit of tube V1 is completed through the relay coil 378 the energization of which draws the armature 118 of the relay over so as to close the contact 126. This energization takes place whenever the tube V1 conducts. The cathode circuit of V2 is similarly conducted through relay coil 380 which controls armature 120 and the cathode circuit of V3 is also similarly connected through relay coil 382 which controls the armature 122. This part of the circuit is quite similar to the corresponding part of the circuit in Figure 1. The contacts 126 are, as in Figure 1, energized by D. C. source 300. The closing of these contacts in sequence energizes the motor 138 through the conductors 130, 132 and 134 in exactly the same manner as described in connection with Figure 1. The motor 138 is here shown as a delta-connected motor with winding 154 and armature 156 but this of course may be a Y-connected motor without departing from the scope of the present invention. The armature of the motor by means of shaft 158 and gear box 140, including gear 160 and lever arm 162, controls the pitch setting of the propeller and hence the load on the prime mover through the hydraulic mechanism to be described later.

*Operation of electrical circuit (Figure 2)*

In the operation of either the system shown in Figure 1 or that shown in Figure 2, a reference signal is matched with the output of a slave engine driven alternator by means of a discriminator circuit to produce a control signal for correcting the load on the slave engine. In Figure 1, master engine 1 produces a reference three phase signal which is balanced against the single phase output of the slave engine driven armature. The control signal produced by the discriminator is used to adjust the load on the slave engine and thus increase or decrease the frequency of the single phase signal to bring this signal and consequently the slave engine into synchronism with the master engine. In Figure 2, the reference frequency is a single phase signal produced by what might be called a master oscillator. Each of the engines are slave engines and have directly connected alternators which produce three phase signals the frequency of which is proportional to its respective engine R. P. M. In this case the three phase signal is balanced against the single phase master signal by means of a discriminator to produce a control signal depending upon the relative frequency of the master oscillator and slave driven alternator. This control signal is used to adjust the load on its respective slave engine so as to increase or decrease the speed thereof which in turn increases or decreases the frequency of the alternator so that the alternator signal and the reference oscillator signal are brought into synchronism with the reference signal and thus the engine is brought into synchronism with the other engines simultaneously controlled by the same reference signal.

*Description of hydraulic mechanism (Figure 2)*

The hydraulic system is controlled by the control arm 16 and shifts the blade pitch as is described and claimed in U. S. Patent 2,307,102 to Blanchard et al. and will be explained in general with reference to Figure 2 of the present disclosure.

The control arm 16 is attached to an oscillatable ring gear 164 engaging a plurality of pinions 166 on high lead screws 168 journalled in a flange 170 and threaded in a control ring 172. The flange 170 is toothed at 174 to drive a pump gear 176 and is attached to a sleeve 178 held against rotation by lugs attached to a rigid support 180. Riding in a groove of the control ring 172 there is a shoe or extension from a carriage 182 that variably supports one end of a lever 184 attached to a valve plunger 186 movable in a valve casing 188, there being a spring 190 engaging the lever 184 between its ends acting normally to move the valve plunger 186 radially inward. The lever 184, and valve elements 186, 188 and 190 constitute a governing valve mounted on a regulator plate 192 providing pitch control passages 194 and 196 which are alternately connectible with a source passage 198 supplying fluid under pressure from a pump 200 driven by the pump gear 176. Attached to the plate 192 there is a cover member 202 that cooperates with the sleeve 178 to form a reservoir 204 containing a quantity of fluid for the control operation of the propeller, and for enclosing the control apparatus which rotates with the propeller. The hub 12 provides sockets 206 journalling the blades 10 whose shank or stem portions enclose a fluid pressure cylinder 208 traversed by a piston 210 having a splined connection at 212 with the cylinder and at 214 with a spindle 216 extending from the hub 12. The piston 210 divides the cylinder into two compartments 218 and 220 respectively connected to control passages 194 and 196, each of which is similarly connected to like chambers of all of the other blades of the same hub. Each blade is provided with a segmental gear 222 that meshes with a coordinating gear 224 concentric with the propeller shaft 226 supporting the propeller for rotation with respect to the rigid support 180.

When the propeller is operating it rotates the regulator 14 about the sleeve 178 which effects operation of the pump 200 to develop pressure in passage 198 leading to the governor valve to surround the valve plunger 186. If the propeller is rotating at the speed called for by the control arm 16 and carriage 182, then the valve plunger will be at an equilibrium position preventing flow through either of the control passages 194 and 196. The valve elements 186, 188 are arranged on the regulator plate 192 so that centrifugal force during propeller rotation tends to move the plunger 186 radially outward of the sleeve 188 against the force of spring 190. Thus, if the propeller rotates at a faster speed than the governed speed, the plunger 186 moves outward to connect the control passage 194 with the source passage 198 so that the fluid under pressure from the pump flows to the piston chamber 218 to move the piston 210 radially outward and turn the blade in a pitch increasing direction. The increased pitch of the blade reduces the speed of the propeller and the change in centrifugal force on the valve plunger permits it to come back to the equilibrium position. If the propeller rotates at a slower speed than that for which the arm 16 and carriage 182 are set, the valve plunger 186 moves inward due to less centrifugal force, and the pump is connected with the decrease pitch chamber 220 to effect proper correction for increasing the speed to equilibrium position of the valve. The basic speed level at which the regulator mechanism is to govern propeller operation is initially set by the movement of pilot's control 20, and can be altered at any time, whether the propeller is rotating or at rest. Oscillation of the arm 16 effects the rotation of screw shafts 168 that slide the control ring 172 axially of the shaft 226 within the reservoir 204 to adjust the carriage 182 along the length of the lever 184. Varying the support at the end of the lever 184 alters the length of the arms and the relation of the arms by which the centrifugal force and spring act upon the speed responsive elements of the governor valve and thereby permit the valve plunger to attain equilibrium position at different speeds, due to the manipulation of the control arm 16. Therefore the operation of the actuator 138 in shifting the arm 16 operates to change the speed setting of the propeller governor, and the speed responsive mechanism within the regulator 14 effects a change in blade pitch to agree with the new speed setting.

It may thus be seen that in either modification of the present invention, the pilot or engineer of the aircraft first brings the engines to roughly the same speed after starting and then turns on the synchronizing system. Thereafter the speed of the engines is controlled simultaneously and automatically by the mere adjustment of the reference signal.

*Description (Figures 3 and 4)*

The modifications of the present invention shown in Figures 3 and 4 are suitable for use as a servo mechanism for remote actuation of aircraft control surfaces or remote controlling of similar mechanical movements. To produce such a servo mechanism, the circuits shown in either Figure 3 or Figure 4 may be combined with the circuits shown in Figure 1 by connecting the points A through H in either Figure 3 or 4 to corresponding points A through H in Figure 1. In making such a modification the part of the circuit in Figure 1 appearing at the left of the above-numbered points is removed and either the circuit shown in Figure 3 or that shown in Figure 4 used as a replacement.

Referring particularly to Figure 3, 400 is a variable frequency single phase oscillator tunable by varying the resistance of potentiometer 402. This may be accomplished by manual or other mechanical movement of the contact 404. This oscillator produces a single phase signal across the points G and H to energize the plate circuits of V1, V2 and V3 simultaneously as discussed in connection with Figure 1. 406 is a three phase oscillator of conventional design the frequency of which may be varied by adjusting the resistance of potentiometer 408 by movement of contact 410. The three phase oscillator 406 is tunable through the same range of frequencies as is the oscillator 400 and produces a three phase signal across the terminals A, B and C having a phase displacement of 120°. The three phase signal thus produced across A, B and C sequentially energizes the grids of the tubes V1, V2 and V3 respectively as set out in greater detail in connection with Figure 1. 412 is an electrical actuator and may include a three phase reversible motor. This actuator is illustrated as being a delta-wound motor and it receives energization from the points D, E and F through conductors 414, 416 and 418. As noted in connection with Figure 1, the signal appearing at terminals D, E and F is a three phase signal with 120° displaced phase and equal in frequency to the difference in frequency of the oscillator 400 and the oscillator 406. The phase rotation of this signal is in one direction when the frequency of the oscillator 400 is greater than the frequency of the oscillator 406 and is in the opposite direction when the frequency of the oscillator 400 is less than that of the oscillator 406. The actuator 412 drives the shaft 420 in such a direction as to adjust the contact 410 of the potentiometer 408 to bring the oscillator 406 into synchronous operation with the oscillator 400. The shaft 420 is mechanically connected to a device to be controlled, here indicated as an aircraft control surface 422.

The electrical part of the circuit shown in Figure 4 is identical to that shown in Figure 3 and like numbers refer to like elements.

It may be desirable in some particular installation to use the variable frequency three phase oscillator as the control element and use the single phase oscillator as the slave element. In order to make this change of elements, the shaft 420 is used to actuate the contact arm 404 and the contact arm 410 is manually operated. In this second modification the slave oscillator 400 is synchronized with the master oscillator 406 using the same circuit arrangement shown in Figure 1 as referred to in connection with Figure 3.

It is to be understood also that although the invention has been described with specific reference to a particular embodiment thereof, it is not to be so limited, since changes and alterations therein may be made which are within the full intended scope of this invention as defined by the appended claims.

We claim:

1. A servo mechanism for causing a slave element to follow the movements of a master element including; a multiphase oscillator the frequency of which is dependent upon the position of the master element, a single phase oscillator the frequency of which is dependent upon the position of the slave element, a grid controlled tube for each phase of said multiphase oscillator, each of said tubes having a plate element and a grid element, means for individually energizing one of said elements of each of said tubes by a respective phase of the multiphase oscillator, means for simultaneously impressing the signal from the single phase oscillator on the other element of each of said tubes, a relay in the plate circuit of each tube energizable upon the coincident in-phase energization of the plate element and grid element of the respective tube, an independent power circuit controlled by the energization of said relays, a reversible motor circuit energized by said independent power circuit for adjustment of the slave element, and means including the sequence of relay energization determining the direction of reversible motor operation and the character of adjustment of the said slave element whereby the movements of said slave element is caused to follow the movement of the master element.

2. In a servo mechanism for causing synchronous operation of a rotating slave element and a rotating master element, manually operated means for selecting the desired speed of rotation of both elements, electronic biasing means for modifying the manually operated selecting means of the slave element for matching the slave element operation with the operation of the master element as a reference speed source, said biasing means including, a multi-phase alternator driven at a speed proportional to the master element speed, a grid controlled tube for each phase of said alternator, each of said tubes having a plate and a grid, the grid of each tube being individually energized by a respective phase of the multi-phase alternator, means connected to said tubes for impressing a common reference signal on the plate of each tube, a relay connected in the plate circuit of each of these tubes, said relays being energized by the plate current of their respective tubes, an independent power circuit connected to said relays and controlled by the energization of said relays, and means connected to said relays and energized by said independent power source dependent upon the order in which said relays are energized for causing reversible actuation of the modifying means of said manually operated means.

3. In a servo mechanism for causing synchronous operation of a rotating slave element and a rotating master element, a multi-phase signal generator driven by one of said elements, a single phase generator driven by the other of said elements, a plurality of grid controlled tubes equal in number to the number of phases of said multiphase signal generator, each of said tubes having a plate and a grid, means connected with said multiphase generator for energizing the control grid of each of said tubes respectively with a phase from said multi-phase generator, means connected with said single phase generator for energizing the plates of all of said tubes simultaneously from said single phase generator, a separate relay connected with the plate of each tube and energizable upon the firing of each respective tube, an independent power circuit connected to said relays and controlled by the energization of said relays, and means connected to said relays and energized by said independent power source as controlled by the sequence of relay energization for adjusting the speed of one of said elements responsive to the plate currents of said tubes so as to cause synchronous operation of said two elements.

4. The combination set forth in claim 3 in which the grid controlled tubes are of the gas filled type.

5. In a servo system for effecting synchronous operation of a rotating slave member and a rotating master member, the combination including manually operated means for selecting the speed level at which the members are to operate, electronic means for modifying the manually operated selecting means of the slave member for matching that member operation with the operation of the master member as a reference speed source, said electronic means including a multi-phase alternator driven at a speed proportional to the master member, a grid controlled tube for each phase of said alternator, each of said tubes having a plate element and a grid element, one of said elements of each tube being individually energized by a respective phase of the multi-phase alternator, means connected to said tubes for impressing a common reference signal on the other said element of each tube, a relay connected in the plate circuit in each tube and energizable upon co-incident energization of both elements of its respective tube, an independent power circuit connected to said relays and controlled by the energization of said relays, and a reversible motor connected with said relays and energized by said independent power circuit for effecting reversible actuation of the modifying means of said manually operated means.

6. In a servo system for effecting synchronous operation of a plurality of rotating members, the combination including, manually operated means for selecting the speed level at which the members are to operate, means for deriving a reference speed source and for selecting the speed level thereof at which the members are to be operated, electronic means for modifying the manually operated means of each member for matching that member operation with said reference speed source, said electronic means including a multi-phase alternator for each member driven at a speed proportional to the speed of the respective member, a grid controlled tube for each phase of said alternators, each of said tubes having a plate element and a grid element, one of said elements of each tube being individually energized by a respective phase of the multi-phase alternators, the other of said elements of each tube being energized by a common reference signal derived from said reference speed source, a relay connected in the output circuit of each tube and energizable upon the co-incident energization of both tube elements, an independent power circuit connected to said relays and controlled by the energization of said relays, and a reversible electric motor electrically connected to said relays and energized by said independent power circuit as controlled by the sequence of energization of the relays by the respective electronic means for effecting reversible actuation of the speed selecting means of the respective member.

7. The combination set forth in claim 6 wherein the tubes of said electronic means have their grid elements energized by the common reference signal and their plate elements individually energized by the respective phases of said alternators.

8. In a servo system for effecting synchronous operation of a rotating slave element and a rotating master element, manually operated means for selecting the speed level at which the elements are to operate, electronic means for modifying the manually operated selecting means of the slave element for matching that element operation with the operation of the master element as a reference speed source, means including an alternator driven by said slave element for deriving a single phase voltage whose frequency is proportional to the speed of the slave element, means including an alternator driven by said master element for deriving a multi-phase voltage whose frequency is proportional to the speed of said master element, said electronic means including means connected to said alternators for comparing the single phase voltage frequency and the multi-phase voltage frequency so as to produce a multi-phase voltage, the frequency of which is proportional to the off-speed error of an erring element and the phase sequence of which is determined by the direction of the off-speed of the erring element, said comparing means including a grid controlled tube for each phase of the multi-phase alternator, each tube having a grid element and a plate element, one of said elements of each tube being individually energized by a respective phase of the multi-phase alternator, the other of said tube elements being energized by a common signal from the single phase alternator, a relay connected in the plate circuit of each tube and energizable upon co-incident energization of both tube elements, an independent power circuit connected to said relays and controlled by the energization of said relays, and a reversible stepping motor electrically connected to said relays and energized by said independent power source dependent upon sequential closing of two or more relays to actuate the manually operated selecting means associated with the slave element, the phase sequence of relay operation and, hence, the direction of motor operation being determined by the lag or lead of the slave element with respect to the speed of the master element.

9. In a servo system for effecting synchronous operation of a plurality of rotating members, manually operated means for selecting the speed level at which the members are to operate, electronic means for modifying the manually selected means of one of the members for matching that member of operation with the speed of the other member, said electronic means including a single phase alternator driven at a speed proportional to one of the members, a multi-phase alternator driven at a speed proportional to a speed of the other of said members, means connected to said alternators for combining the frequencies of both alternators to produce a signal that is proportional to the off-speed error of said one member, and whose phase sequence is determined by the lag and lead of said one member over the speed of said other member, said combining means including a grid controlled tube for each phase of the multi-phase alternator, each of said tubes having a grid element individually energized by a respective phase of the multi-phase alternator, and a plate element, each of which is energized by a common reference signal from the single phase of said other alternator, a relay connected in the plate circuit of each tube and energized upon coincident energization of both tube elements, an independent power circuit connected to said relays and controlled by the energization of said relays, and a stepping motor having a plurality of windings each in circuit connection with one of said relays and energized by said independent power source for actuating the manually operated selecting means upon sequential operation of two or more of the relays, the direction of motor operation depending upon the lag or lead sequence of relay operation as determined by the sequence of co-incident energization of both tube elements.

10. In a servo mechanism for effecting coincident operation of a plurality of members including, a first electrical signal source the frequency of which is dependent upon the operative condition of one of said members, operation selecting means for another of said members, a second electrical signal source operatively connected to said operation selecting means and providing a reference frequency determined by said selecting means, one of said sources being multi-phase and the other of said sources being single-phase, a grid controlled tube for each phase of said multi-phase source, each of said tubes having a plate element and a grid element, means connected to said multi-phase source for individually energizing one of said elements of each tube by a respective phase of said multi-phase source, means connected to said single phase source for simultaneously impressing the signal from said single-phase source on the other element of each tube, a relay in the output circuit of each tube, said relays being energized by the output of their respective tubes, an independent power circuit connected to said relays and controlled by the energization of said relays, and means connected to said relays and energized by said independent power circuit dependent upon the order in which said relays are energized for causing the coincident operation of the first recited member with the selected operation of the second recited member.

11. A servo mechanism for causing a slave element to follow the movements of a master element including; a multiphase oscillator the frequency of which is dependent upon the position of the slave element, a single phase oscillator the frequency of which is dependent upon the position of the master element, a grid controlled tube for each phase of said multiphase oscillator, each of said tubes having a plate element and a grid element, means connected to said multi-phase oscillator for individually energizing one of said elements of each of said tubes by a respective phase of the mutliphase oscillator, means connected to said single phase oscillator for simultaneously impressing the signal from the single phase oscillator on the other element of each of said tubes, a relay in the plate circuit of each tube energizable upon the coincident in-phase energization of the plate element and grid element of the respective tube, an independent power circuit connected to said relays and controlled by the energization of said relays, a reversible motor circuit energized by said independent power circuit for adjustment of the slave element, and means interconnecting said relays and said reversible motor circuit, and dependent upon the sequence of relay energization, for determining the direction of reversible motor operation and the character of adjustment of the said slave element whereby the movement of said slave element is caused to follow the movement of the master element.

JAMES W. LIGHT.
ROBERT C. TRESEDER.

References Cited in the file of this patent
UNITED STATES PATENTS

| Number | Name | Date |
|---|---|---|
| 1,899,595 | Snyder et al. | Feb. 28, 1933 |
| 2,231,133 | MacNeil | Feb. 11, 1941 |
| 2,258,462 | Martin | Oct. 7, 1941 |
| 2,322,114 | Clare et al. | June 15, 1943 |
| 2,404,344 | Wild | July 16, 1946 |
| 2,408,451 | Sorensen | Oct. 1, 1946 |
| 2,503,105 | Freas, Jr. | Apr. 4, 1950 |
| 2,517,703 | Offner | Aug. 8, 1950 |
| 2,551,306 | Wisman | May 1, 1951 |